(12) United States Patent
Benje et al.

(10) Patent No.: US 9,803,919 B2
(45) Date of Patent: Oct. 31, 2017

(54) METHOD FOR DRYING A HUMID POLYMER POWDER AND DEVICE SUITABLE FOR SAID METHOD

(75) Inventors: Michael Benje, Bad Soden (DE); Peter Kammerhofer, Burgkirchen (DE)

(73) Assignees: THYSSENKRUPP UHDE GMBH, Dortmund (DE); VINNOLIT GMBH & CO. KG, Burgkirchen (DE)

( * ) Notice: Subject to any disclaimer, the term of this patent is extended or adjusted under 35 U.S.C. 154(b) by 749 days.

(21) Appl. No.: 14/004,210

(22) PCT Filed: Feb. 23, 2012

(86) PCT No.: PCT/EP2012/000773
§ 371 (c)(1),
(2), (4) Date: Oct. 22, 2013

(87) PCT Pub. No.: WO2012/123063
PCT Pub. Date: Sep. 20, 2012

(65) Prior Publication Data
US 2014/0047732 A1    Feb. 20, 2014

(30) Foreign Application Priority Data

Mar. 15, 2011  (DE) .................. 10 2011 014 131

(51) Int. Cl.
*F26B 3/08* (2006.01)
*F26B 3/02* (2006.01)
(Continued)

(52) U.S. Cl.
CPC ............ *F26B 3/02* (2013.01); *B29B 13/065* (2013.01); *C08F 6/005* (2013.01); *F26B 3/084* (2013.01);
(Continued)

(58) Field of Classification Search
CPC ...... B29B 13/065; F26B 3/084; F26B 23/001; F26B 3/02; F26B 23/10; C08F 6/20;
(Continued)

(56) References Cited

U.S. PATENT DOCUMENTS 4,230,668 A * 10/1980 Sheely ...................... B01J 8/18
422/140
5,146,857 A    9/1992 Spliethoff et al.
(Continued)

FOREIGN PATENT DOCUMENTS

CN          1517655 A  *  8/2004
CN        101087817 A    12/2007
(Continued)

OTHER PUBLICATIONS

Japanese Office Action dated Aug. 25, 2015.
(Continued)

*Primary Examiner* — Kenneth Rinehart
*Assistant Examiner* — Bao D Nguyen
(74) *Attorney, Agent, or Firm* — Michael W. Ferrell; Ferrells, PLLC; Anna L. Kinney

(57) ABSTRACT

An apparatus (1) and method for drying polymer powders is described. The apparatus has an inlet (2) and an outlet (3) for the polymer powder, heat registers (5) installed in the interior space (4) and lines (7) for a heated gas (6a) for drying the polymer powder. The lines open into the interior space (4) and are connected to heat exchangers (9) for heating gas (6). The heat exchangers (9) are connected to a plant for the preparation of 1,2-dichloroethane (15) and/or for the preparation of vinyl chloride from 1,2-dichloroethane so that thermal energy from the plant can be utilized for heating the gas (6). The method comprises treatment of a polymer powder with a heated gas (6a) in the drying apparatus (1).

13 Claims, 3 Drawing Sheets

(51) Int. Cl.
*B29B 13/06* (2006.01)
*F26B 3/084* (2006.01)
*F26B 23/00* (2006.01)
*C08F 6/00* (2006.01)
*F26B 23/10* (2006.01)

(52) U.S. Cl.
CPC ... *F26B 23/001* (2013.01); *B01J 2219/00006* (2013.01); *F26B 23/10* (2013.01); *Y02P 20/124* (2015.11); *Y02P 70/405* (2015.11)

(58) Field of Classification Search
CPC ...... C08F 6/005; Y02P 20/124; Y02P 70/405; B01J 2219/00006
USPC .............................................. 34/359, 513, 86
See application file for complete search history.

(56) References Cited

U.S. PATENT DOCUMENTS

| | | | |
|---|---|---|---|
| 5,940,987 | A | 8/1999 | Stummer |
| 6,148,540 | A | 11/2000 | Ohmura et al. |
| 6,833,096 | B2 | 12/2004 | Wang et al. |
| 7,947,794 | B2 | 5/2011 | Weismantel et al. |
| 2004/0143988 | A1 | 7/2004 | Stanek et al. |
| 2007/0259987 | A1 | 11/2007 | Schattka |
| 2008/0127507 | A1* | 6/2008 | Bindelle .................. C08F 6/20 34/343 |
| 2008/0201980 | A1* | 8/2008 | Bullinger .................. B03B 4/06 34/493 |
| 2009/0306439 | A1* | 12/2009 | Petersen .............. B01J 19/2425 570/246 |
| 2011/0144301 | A1 | 6/2011 | Enderle et al. |
| 2011/0178345 | A1* | 7/2011 | Gnabs .................. B01J 8/0055 570/243 |

FOREIGN PATENT DOCUMENTS

| | | |
|---|---|---|
| DE | 3034983 A1 | 4/1982 |
| DE | 226196 A1 | 8/1985 |
| DE | 3445437 A1 | 1/1986 |
| DE | 271943 A1 | 9/1989 |
| DE | 279806 A1 | 6/1990 |
| DE | 4132591 A1 | 4/1993 |
| DE | 4240716 A1 | 6/1994 |
| DE | 69633192 T2 | 8/2005 |
| DE | 102004035937 A1 | 2/2006 |
| DE | 102005042609 A1 | 3/2007 |
| DE | 60212652 T2 | 6/2007 |
| DE | 102007020951 A1 | 11/2008 |
| FR | 2 879 608 A1 | 6/2006 |
| JP | H02143080 A | 6/1990 |
| JP | 2007284530 A | 11/2007 |
| JP | 2008516182 A | 5/2008 |
| JP | 2008524551 A | 7/2008 |
| KZ | 20576 A4 | 12/2008 |
| SU | 1838635 A3 | 8/1993 |
| WO | 2006044264 A2 | 4/2006 |
| WO | 2006067126 A1 | 6/2006 |
| WO | 2008127709 A2 | 10/2008 |
| WO | 2010019246 A2 | 2/2010 |
| WO | 2010034392 A1 | 4/2010 |

OTHER PUBLICATIONS

International Preliminary Report on Patentability.
Decision of Grant of Russian Patent dated May 5, 2016.
P.V. Smallwood, "Vinyl Chloride Polymers, Polymerization", Encyclopedia of Polymer Science and Engineering, 1989, pp. 295-319 and 328-329, vol. 17, John Wiley & Sons, Inc.
L. Brown, The New Shorter Oxford English Dictionary on Historical Principles, 1993, pp. 2692 and 3633, vol. 2, Oxford University Press, Oxford.
E. Linak, et al., "CEH Product Review, Vinyl Chloride Monomer (VCM)", Chemical Economics Handbook, Oct. 2003, pp. 1-34, SRI International.
Witenhafer et al., "3 Polymerization", PVC Handbook, 2005, pp. 57-66, 69-74, and 93-94, Hanser Publishers, Munich.
A.V. Borruso, "CEH Product Review, Vinyl Chloride Monomer (VCM)", Chemical Economics Handbook, Jul. 2006, pp. 1-41, SRI Consulting.
De Araujo, et al., "Optimal Operation of an Industrial PVC Dryer", Drying Technology, 2011, pp. 19-34, vol. 29, Taylor & Francis Group, LLC.
"Saturated Steam", Corrosionpedia, obtained from https://www.corrosionpedia.com/detinition/1005/saturated-steam on Dec. 1, 2016.

* cited by examiner

METHOD FOR DRYING A HUMID POLYMER POWDER AND DEVICE SUITABLE FOR SAID METHOD

CLAIM FOR PRIORITY

This application is a national phase application of PCT/EP2012/000773, FILED Feb. 23, 2012, which was based on application DE 10 2011 014 131.6, filed Mar. 15, 2011. The priorities of PCT/EP2012/000773 and DE 10 2011 014 131.6 are hereby claimed and their disclosures incorporated herein by reference.

TECHNICAL FIELD

The invention relates to an apparatus and a method for drying moist polymer powder.

BACKGROUND

In the preparation of polymers, moist polymer powders which are treated in subsequent drying stages are frequently obtained. The drying of polymer powders has been practiced for a long time. A wide variety of apparatuses, for example drum dryers, screw dryers or fluidized-bed dryers and also an apparatus for spray drying, are used for this purpose.

Thus, for example, DE 602 12 652 T2 describes a method of dewatering and degassing polymer powders by use of an extruder.

DE 10 2007 020 951 A1 discloses a method and an apparatus for purifying a resorbable polyester. Here, a moist polymer composition is dried using a fluidized-bed dryer.

DE 696 33 192 T2 describes a method and an apparatus for drying pulverized material, which is carried out on spiral tracks in a cylindrical tube.

DE 42 40 716 A1 discloses a method of drying vinyl chloride polymers by convective cocurrent drying. The method uses a flow tube and a directly adjoining cyclone dryer unit without additional contact heating.

DE 30 34 983 A1 discloses a method of thermally after-treating polymers of vinyl chloride which can be converted into a paste. The polymer emulsions obtained are subjected to spray drying.

Fluidized-bed granulating dryers in which part of the heat generated in the process is recovered in order to make the overall process more efficient have also been described. Such an apparatus is known from DE 34 45 437 A1.

Many chemical reactions, including polymerization reactions or processes for preparing monomers required therefor, are exothermic. Utilization of the heat of reaction evolved in the chemical reaction or else the waste heat from work-up processes in the preparation of such compounds would improve the energy efficiency of the production processes. However, there is often the problem that the waste heat is obtained at a temperature level which is too low for the use.

1,2-Dichloroethane (hereinafter "DCE") is used predominantly as intermediate in the preparation of monomeric vinyl chloride (hereinafter "VC") which is in turn used as intermediate for the preparation of polyvinyl chloride (hereinafter "PVC"). Hydrogen chloride HCl is formed in the conversion of DCE into monomeric vinyl chloride. This hydrogen chloride is preferably used in the preparation of DCE by oxychlorination of ethene by means of HCl and oxygen. An alternative route for the preparation of DCE proceeds via the direct chlorination of ethene by means of chlorine. Both routes are employed in the industrial preparation of DCE, so that a good balance between the following reaction equations is achieved in respect of the hydrogen chloride produced and consumed:

$$Cl_2 + C_2H_4 \rightarrow C_2H_4Cl_2 + 218 \text{ kJ/Mol}$$

$$C_2H_4Cl_2 \rightarrow C_2H_3Cl + HCl - 71 \text{ kJ/Mol}$$

$$C_2H_4 + 2\ HCl + \frac{1}{2}O_2 \rightarrow C_2H_4Cl_2 + H_2O + 238 \text{ kJ/Mol}$$

The total balance of the DCE reaction is exothermic. DCE plants are frequently coupled with plants for the preparation of VC and for PVC production.

The polymer obtained in PVC production is frequently moist, especially when the polymerization is carried out as emulsion or suspension polymerization. The polymer powder therefore has to be dried after production and removal of excess liquid. Fluidized-bed dryers are often used for this purpose.

SUMMARY OF INVENTION

It has now been found that the thermal energy obtained in the preparation and work-up of 1,2-dichloroethane is well suited to the operation of drying apparatuses for polymer powders.

It is an object of the present invention to provide an improved drying method for polymer powders and an apparatus suitable therefor, which have a particularly high energy efficiency.

The invention provides a method of drying polymer powders in a drying apparatus (1), which comprises the steps:
i) treatment of a polymer powder with a heated gas (6a) in a drying apparatus (1) equipped with inlet (2) and outlet (3) for the polymer powder and with heat registers (5) installed in the interior space (4),
ii) introduction of heated gas (6a) through lines (7) into the interior space (4) of the drying apparatus (1),
iii) heating of gas (6) in heat exchangers (9) for producing heated gas (6a), wherein
iv) the heating of the heat exchangers (9) is effected by means of a hot fluid (5a, 10, 19) which has been heated by means of thermal energy which originates from a plant for the preparation of 1,2-dichloroethane (15) and/or for the preparation of vinyl chloride from 1,2-dichloroethane.

Preferred embodiments of the method of the invention are enumerated in the dependent claims.

As can be seen from FIGS. 1 to 3 described below, the fluidized-bed dryer which is preferably used as drying apparatus is firstly heated by means of heat registers through which a hot fluid, preferably hot water, flows. Secondly, the fluidizing gas, in particular air, is itself preheated by means of a hot fluid, preferably by means of hot water.

Drying takes place at moderate temperatures. Thus, the admission temperature of the fluid used for the heat registers, for example hot water, is typically in the range from 80 to 105° C., preferably about 96° C. The fluidizing gas is likewise typically preheated to temperatures in the range from 80 to 110° C., preferably to about 96° C.

The temperature level of these heat sinks is very well suited to being heated by means of the heat of reaction of one or both exothermic reactions of the DCE/VC process. The direct chlorination is particularly suitable here.

However, the heat of reaction of the oxychlorination can also be used.

Naturally, the plants for the direct chlorination or for the oxychlorination do not have to be integrated with a plant for the preparation of vinyl chloride but can also be stand-alone plants.

Particular preference is given to a mode of operation in which a heat transfer medium circuit whose admission temperature is set to values suitable for the fluidized-bed drying of PVC is heated by means of the heat of reaction of the direct chlorination or the oxychlorination.

In the method of the invention, heating of the heat exchangers (9) is effected by means of a hot fluid (5a, 10, 19) which has in turn been heated by means of thermal energy from a plant for the preparation of 1,2-dichloroethane (15) and/or for the preparation of vinyl chloride from 1,2-dichloroethane. This can be a hot reaction component or another heated fluid component from the plant for the preparation of 1,2-dichloroethane or for the preparation of vinyl chloride, for example hot 1,2-dichloroethane, or is a fluid which has been heated by means of thermal energy from the plant for the preparation of 1,2-dichloroethane or for the preparation of vinyl chloride and is preferably circulated in order to transport thermal energy from the plant to the drying apparatus. Particular preference is given to using water, in particular water which has been heated by heat exchange with hot 1,2-dichloroethane, for example with hot liquid 1,2-dichloroethane or with hot, condensing, gaseous 1,2-dichloroethane, as fluid.

Particular preference is given to a method in which the circulated heat transfer medium is water.

In a further preferred variant of the method, the heat transfer medium circuit is heated by means of the waste heat from distillation columns. The heat transfer medium then flows through the coolant side of the overhead condenser of a column. Particular preference is given to a method in which the column is itself heated by means of the heat of reaction of the direct chlorination or the oxychlorination.

The present invention also provides an apparatus (1) for drying polymer powders, which has an inlet (2) and an outlet (3) for the polymer powder and heat registers (5) installed in the interior space (4) and lines (7) for a heated gas (6a) for drying the polymer powder, which lines open into the interior space (4), wherein the lines (7) are connected to heat exchangers (9) for heating a gas (6) and the heat exchangers (9) are also connected via lines to a plant for the preparation of 1,2-dichloroethane (15) and/or for the preparation of vinyl chloride from 1,2-dichloroethane, in which hot fluid for heating the gas (6) is introduced and discharged.

As dryers, it is possible to use any apparatuses in which the polymer powder to be dried is treated with a hot gas and which additionally have heat registers in the interior, as is the case for fluidized-bed dryers. Very particular preference is given to using fluidized-bed dryers as dryers.

As heat exchangers, it is possible to use any apparatuses suitable for this purpose in the apparatus of the invention. Examples are shell-and-tube heat exchangers and very particularly preferably plate heat exchangers.

The invention is directed in particular to the heating of an apparatus for drying moist PVC powder by means of the heat of reaction of an exothermic reaction and/or by means of the heat generated in the work-up of the process product originating from a process for the preparation of vinyl chloride and/or for the preparation of 1,2-dichloroethane.

However, the apparatus of the invention can also be used for drying other polymer powders.

The invention is very particularly preferably directed to the heating of a fluidized-bed dryer for drying moist PVC by means of the heat evolved in the direct chlorination of ethylene to 1,2-dichloroethane or by means of the heat evolved in the oxychlorination of ethylene by means of hydrogen chloride and oxygen.

Particular embodiments of the apparatus of the invention are enumerated in the dependent claims.

BRIEF DESCRIPTION OF THE DRAWINGS

The invention is illustrated by way of example below with the aid of three attached Figures, without any restriction being implied thereby, wherein.

DETAILED DESCRIPTION OF THE INVENTION

The invention is described in detail for purposes of illustration only. Modifications to particular examples within the spirit and scope of the present invention, set forth in the appended claims, will be readily apparent to one of skill in the art. Terminology used herein is given its ordinary meaning unless otherwise specifically indicated.

Figure 1:
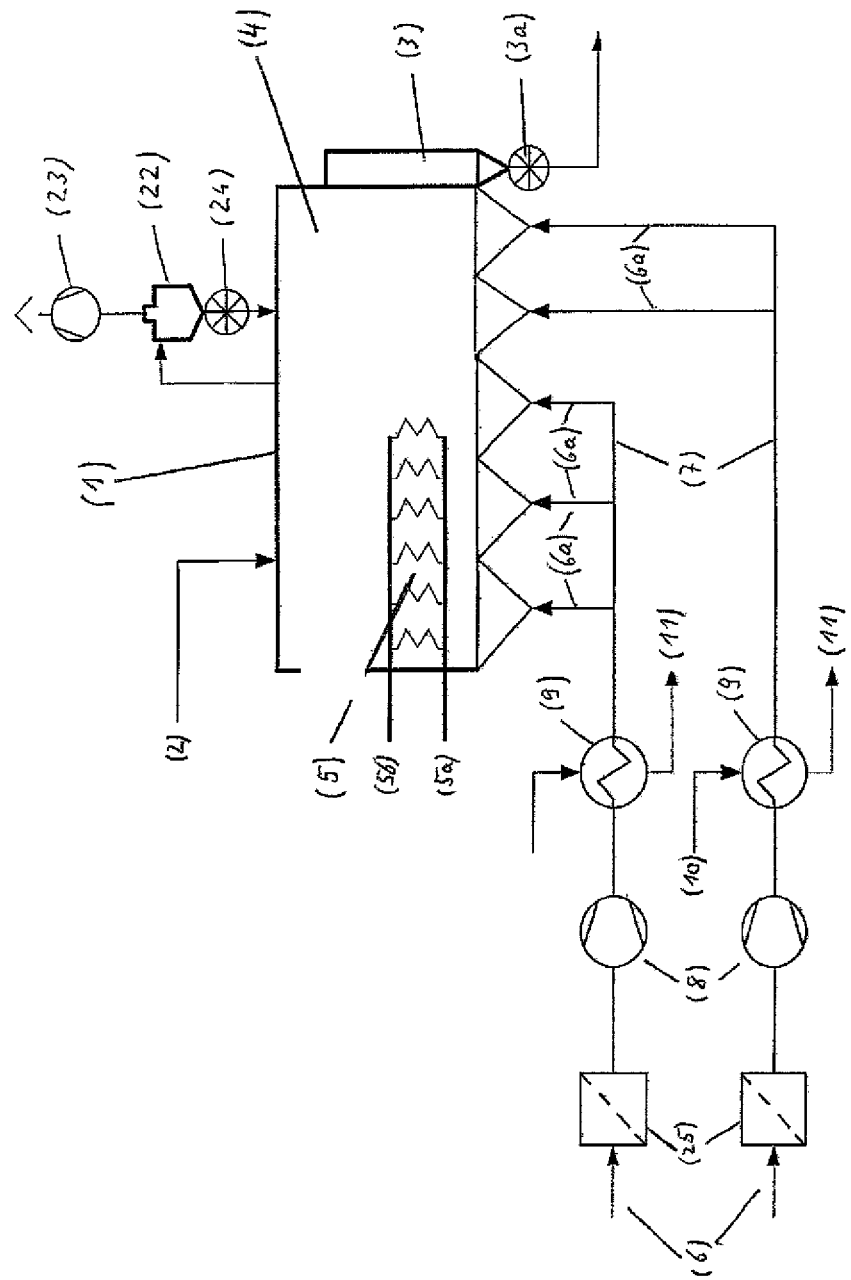
FIG. 1 is a schematic view of an apparatus according to the invention and of the method of the invention.

FIG. 1 depicts a variant of the dryer of the invention and the method of the invention. The figure shows a fluidized-bed dryer (1) having an inlet (2) for moist polymer powder and an outlet (3) for dried polymer powder which is discharged from the dryer via a star feeder (3a). Likewise shown is an outlet for the air used in the fluidized-bed dryer (1). This comprises a cyclone (22) with a downstream blower (23) and a star feeder (24) for recirculating the polymer powder precipitated in the cyclone (22) to the fluidized-bed dryer (1). In the interior, the fluidized-bed dryer (1) is heated by means of hot water (5a). The heat for heating the water (5a) originates at least partly from the waste heat from a plant for the preparation of 1,2-dichloroethane (not shown). This is passed through heat registers (5) installed in the interior space (4); the cooled water (5b) is discharged from the heat register (5). The fluidized bed is produced by means of heated air (6a). This is fed in through lines (7) at the underside of the fluidized-bed dryer. Blowers (8) ensure a sufficient pressure of the air (6a); air filters (25) are in each case installed upstream of the blowers (8). The air (6) is heated by means of heat exchangers (9) which are heated by means of hot fluid (10) which has been heated by means of thermal energy from a plant (not shown) for the preparation of 1,2-dichloroethane and/or a plant for the preparation of vinyl chloride. The cooled fluid (11) from the heat exchangers (9) is preferably recirculated in order to take up thermal energy from the plant for the preparation of 1,2-dichloroethane or from the plant for the preparation of vinyl chloride again.

Figure 2:
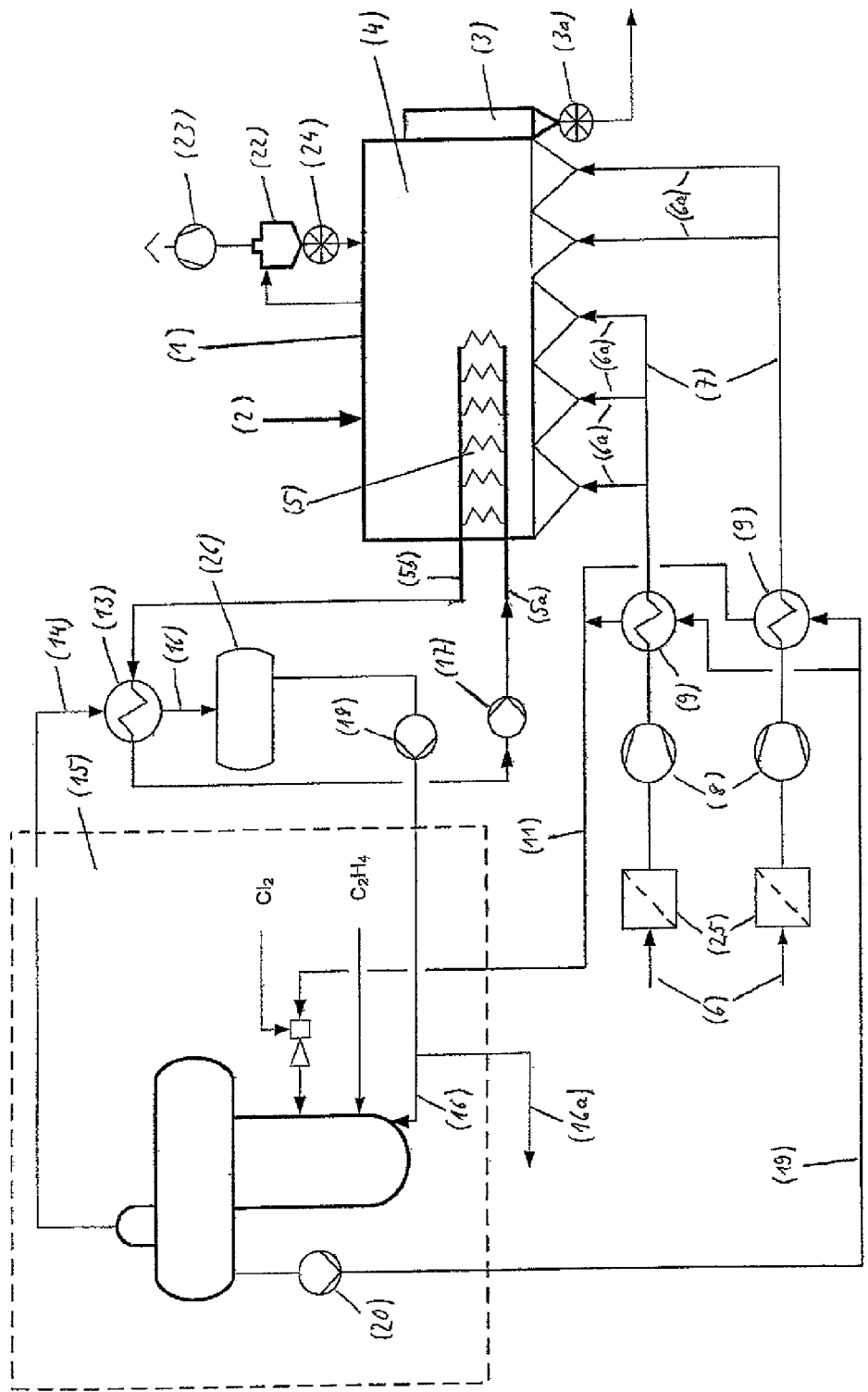
FIG. 2 is a schematic view of an apparatus according to the invention integrated into an EDC plant.

FIG. 2 depicts a connection of the variant of the dryer of the invention and the method of the invention shown in FIG. 1 with a DCE plant. Fluidized-bed dryer (1) with inlet (2), cyclone (22), blowers (23), star feeder (24), outlet (3), star feeder (3a) and heat register (5) in the interior space (4) are supplied with heated air (6a) as shown in FIG. 1. This air is introduced into the interior space (4) through lines (7) at the underside of the fluidized-bed dryer (1) by means of blowers (8). The heat registers (5) are heated by means of hot water (5a) which is heated by means of heat exchangers (13) and leaves the heat register as cooled water (5b), so that water is circulated between heat registers (5) and heat exchangers (13). Pump (17) is used for this purpose. The heat for heating the hot water originates from DCE vapor (14) from a DCE plant (15) (here: a DCE direct chlorination plant) which after heat exchange is temporarily stored as DCE condensate (16) in the collection tank (26) and is recirculated to the DCE plant (15) or partly discharged as DCE product (16a) from the DCE plant (15). Pump (18) is used for this purpose. The air (6) is heated by means of heat exchangers (9) which are heated by means of liquid DCE (19) from the DCE plant (15). The air (6) is passed through air filters (25) and fed to the heat exchangers (9) by means of blowers (8). The liquid DCE (19) is fed to the heat exchangers (9) via pump (20). The cooled DCE (11) from the heat exchangers (9) is recirculated to the DCE plant (15).

Figure 3:
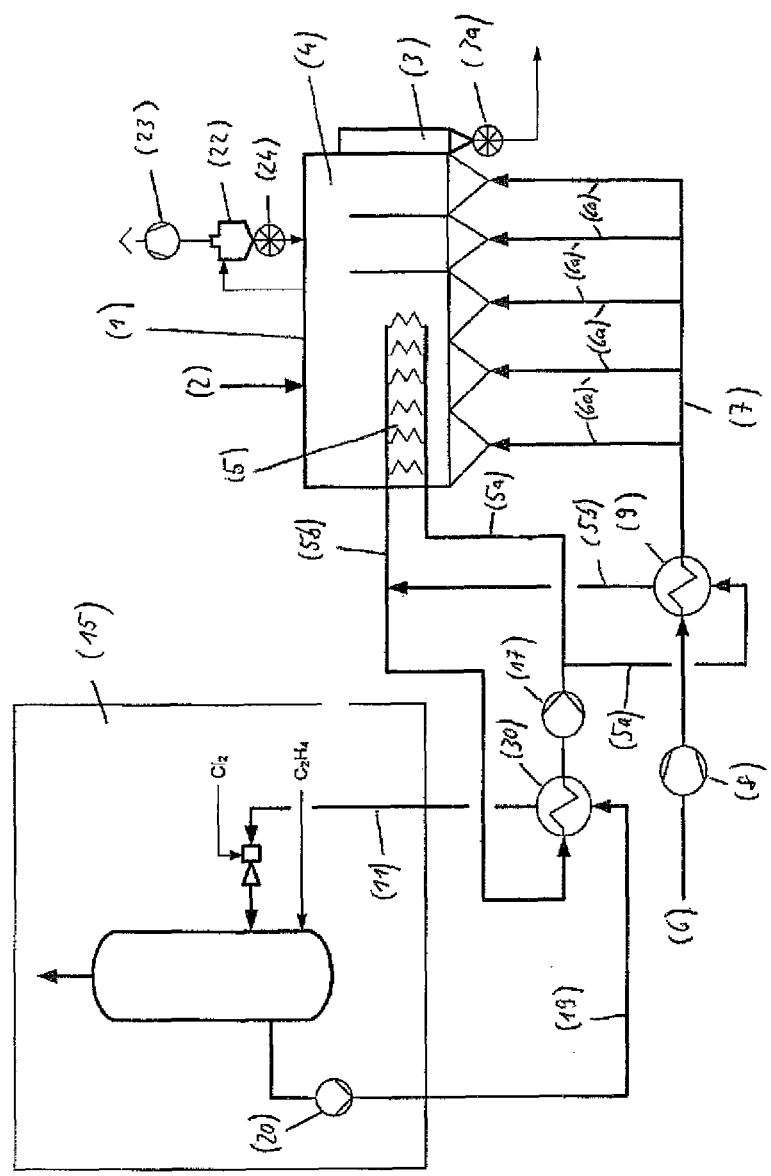
FIG. 3 is a schematic view of a further apparatus according to the invention integrated into an EDC plant.

FIG. 3 depicts a further, particularly preferred connection of the variant of the dryer of the invention and the method of the invention shown in FIG. 1 with a DCE plant. The structure corresponds to that of the plant of FIG. 2 with the modification that heat exchangers (9) for heating the air (6) and heat exchangers (30) for generating hot water (5a) are operated using hot DCE (19) from the DCE plant (15). The dryer (1) is thus heated here by means of hot water which has in turn been heated by means of thermal energy originating from the DCE plant (15). The streams of the hot water (5a) and the cooled water (5b) are circulated.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

The invention claimed is:

1. A method of drying polymer powders in a drying apparatus (1), which comprises the steps:
   i) treatment of the polymer powder with a heated gas (6a) in the drying apparatus (1) equipped with an inlet (2) and an outlet (3) for the polymer powder and with heat registers (5) installed in an interior space (4) of the drying apparatus (1),
   ii) introduction of the heated gas (6a) through lines (7) into the interior space (4),
   iii) heating of the gas (6) in heat exchangers (9) for producing heated gas (6a), wherein
   iv) the heating of the heat exchangers (9) for producing heated gas is effected by means of hot liquid 1,2-dichloroethane (19) which has been heated by means of thermal energy which originates from a plant for preparation of 1,2-dichloroethane (15), and
   v) wherein hot water (5a) which has been heated in a heat exchanger (13) for heating water, for which heat is derived from 1,2-dichloroethane vapor (14) which has been heated by means of thermal energy which originates from the plant for the preparation of 1,2-dichloroethane (15), flows through the heat registers (5).

2. The method as claimed in claim 1, wherein the gas (6) is air.

3. The method as claimed in claim 2, wherein heated air (6a) is introduced into the interior space (4) through air lines (7) on an underside of the fluidized-bed dryer (1), resulting in fluidization of the polymer powder, and the heat registers (5) are heated by means of the hot water (5a), which leaves the heat registers (5) as cooled water (5b), and is reintroduced into the heat exchanger (13) for heating water so that water is circulated between heat registers (5) and the heat exchanger (13) for heating water.

4. The method as claimed in claim 3, wherein liquid 1,2-dichloroethane from the plant for the preparation of 1,2-dichloroethane (15) is introduced into the heat exchangers (9) for producing heated gas so that waste heat of the liquid 1,2-dichloroethane is utilized for heating the air (6).

5. The method as claimed in claim 3, wherein the hot liquid 1,2-dichloroethane is heated by means of waste heat from distillation columns of the plant for the preparation of 1,2-dichloroethane (15) and the hot liquid 1,2-dichloroethane is subsequently introduced into the heat exchangers (9) for heating gas so that waste heat of 1,2-dichloroethane preparation is utilized for heating the air (6).

6. The method as claimed in claim 1, wherein the plant for the preparation of 1,2-dichloroethane (15) is a direct chlorination plant or an oxychlorination plant.

7. The method as claimed in claim 1, wherein the drying apparatus is a fluidized-bed dryer.

8. The method as claimed in claim 1, wherein the hot water (5a) has been heated in the heat exchanger (13) for heating water by use of a further hot fluid and the further hot fluid originates from the plant for the preparation of 1,2-dichloroethane (15).

9. An apparatus (1) for drying polymer powders, which has an inlet (2) and an outlet (3) for the polymer powder and heat registers (5) installed in an interior space (4) of the drying apparatus (1) and lines (7) for a heated gas (6a) for drying the polymer powder, which lines open into the interior space (4),
   wherein the lines (7) are connected to heat exchangers (9) for heating gas (6) and the heat exchangers (9) for heating gas are connected to a plant for preparation of 1,2-dichloroethane (15) so that hot liquid 1,2-dichloroethane (19) which has been heated by means of thermal energy from the plant for the preparation of 1,2-dichloroethane (15) can be utilized for heating the gas (6),
   wherein hot water (5a) is passed through the heat registers (5) which are connected to a heat exchanger (13) for heating water flowing through the heat registers (5) and the heat exchanger (13) for heating water is additionally connected via line (14) to the plant for the preparation of 1,2-dichloroethane (15), in which 1,2-dichloroethane vapor (14), which has been heated by means of thermal energy which originates from the plant for the preparation of 1,2-dichloroethane (15), is introduced and discharged through the heat exchanger (13) for heating water.

10. The apparatus as claimed in claim 9, wherein the plant for the preparation of 1,2-dichloroethane (15) is a direct chlorination plant or an oxychlorination plant.

11. The apparatus as claimed in claim 9, wherein the apparatus is a fluidized-bed dryer.

12. The apparatus as claimed in claim 11, wherein the gas (6) is air, and wherein air lines (7) via which heated air (6a) is introduced into the interior space (4) are provided on an underside of the fluidized-bed dryer (1), and heating of the heat registers (5) is effected by means of the hot water (5a), which leaves the heat registers (5) as cooled water (5b) and is reintroduced into the heat exchanger (13) for heating water so that water is circulated between heat registers (5) and the heat exchanger (13) for heating water.

13. The apparatus as claimed in claim 12, wherein the heat exchangers (9) for heating gas are connected to distillation columns from the plant for the preparation of 1,2-dichloroethane (15) so that waste heat of the liquid 1,2-dichloroethane from the distillation columns can be utilized for heating the air (6).

* * * * *